United States Patent [19]

Hilton

[11] Patent Number: 5,064,466
[45] Date of Patent: Nov. 12, 1991

[54] NON-TOXIC PROCESS FOR RECOVERY OF PHOTOGRAPHIC SILVER

[76] Inventor: Davis B. Hilton, Box 79, Grand Sabre, Tex. 75140

[21] Appl. No.: 622,350

[22] Filed: Nov. 30, 1990

Related U.S. Application Data

[63] Continuation of Ser. No. 299,403, Jan. 19, 1989, abandoned.

[51] Int. Cl.$^5$ .............................................. C22B 3/20
[52] U.S. Cl. ........................................ 75/417; 75/427; 75/713
[58] Field of Search .................... 75/417, 83, 427, 713, 75/118 P; 252/156

[56] References Cited

U.S. PATENT DOCUMENTS

| | | | |
|---|---|---|---|
| 3,594,157 | 7/1971 | Hendrickson et al. | 75/112 |
| 3,647,422 | 3/1972 | Wainer | 75/101 |
| 3,660,079 | 5/1972 | Govani | 75/109 |
| 3,960,550 | 6/1976 | Dusenberry | 75/83 |
| 4,445,935 | 5/1984 | Posey et al. | 75/118 P |
| 4,612,057 | 9/1986 | Buser et al. | 134/13 |
| 4,765,835 | 8/1988 | Schoenhard | 75/118 P |

FOREIGN PATENT DOCUMENTS 644216  7/1984 Switzerland.
1454708 11/1976 United Kingdom .................... 75/83

Primary Examiner—Melvyn J. Andrews
Attorney, Agent, or Firm—Robert Hardy Falk; Henry Croskell

[57] ABSTRACT

A non-toxic process for the recovery of silver from silver containing photographic emulsion coated paper or film substrates is provided. The process includes the use of a stripping formulation comprised of an alkaline bleach solution which is capable of holding stripped animal protein, silver and silver halide in solution during separation of the substrate materials. The solution containing the silver, silver halide and animal protein is treated with a strong or highly ionized acid which results in controlled precipitation of hydrolyzed animal protein, silver and silver halide. Waste fluids are neutralized with an alkali metal hydroxide, the precipitate is dried to a sludge, carbon content of the sludge is control burned and the residue is smelted with appropriate fluxes in order to achieve silver ingot.

11 Claims, 2 Drawing Sheets

NON-TOXIC PROCESS FOR RECOVERY OF PHOTOGRAPHIC SILVER

This application is a continuation of application Ser. No. 299,403, filed 1/19/89.

BACKGROUND OF THE INVENTION

The present invention relates to the recovery of silver from photographic materials. The invention further relates to a new process for recovering metallic silver from scrap materials and particularly from scrap materials in which substantial portions of the silver is combined as halide salts, such as in photographic emulsion scrap materials.

Used and green non-used photographic emulsion materials from the photographic industries take a number of forms, including batches of photographic emulsions which are separated from or which have never been combined with a film or paper substrate, unexposed emulsions on a film or paper substrate and exposed emulsions on a film or paper substrate. The most valuable constituent of these scrap materials is the silver, however, the film substrate material can be reclaimed under appropriate conditions.

Various methods have been used to recover silver from photographic materials such as burning the scrap emulsion in a furnace. Other processes for reclaiming silver from photographic substrates have been used, and some of these processes have involved complicated and expensive equipment such as centrifuges for the purposes of separating silver from liquids in which the silver is precipitated, after being removed from the photographic substrate material such as plastic film, paper or the like. Centrifuges are expensive and require careful attention as well as proper maintenance.

Other methods utilize chemical solution treatments such as the use of sodium cyanide or sodium thiosulfate but these chemical compounds present severe disposal problems and are toxic. The common methods of burning the materials or chemically treating photographic materials in a stripping fashion all involve a number of serious problems and disadvantages. For instance, the burning of emulsion materials produces serious air pollution, since the silver is present in the emulsion in a proportion of only about 1 to about 7 percent by weight and most of the remainder, other than moisture content consists of organic materials such as animal fat, protein, gelatin, natural fine bone and wood pulp. Furthermore, as much as 10 to 20 percent of the silver is lost in the smoke emitted upon burning operations and therefore cannot be subsequently recovered in the smelter. Because the burning process has been regarded as an important method by which the silver can be recovered, tremendous investments have been made in facilities for burning huge quantities of photographic emulsion scrap while taking special precautions to try to minimize the resulting air pollution and loss of silver as dust in the flue gases.

On the other hand, in the smelting of chemically produced precipitates, gathered from the stripping and washing of silver from photographic substrates, various fluxes have been used such as sodium carbonate or sodium ash and borax. With such prior art fluxes, high alkalinity destroys the crucibles and in this fashion the prior art methods for smelting of the reclai silver materials have been relatively costly and presented environmental problems. Chemical solution methods according to the prior art provide for the washing of x-ray films and other photographic materials on similar substrates with silver halides contained in the emulsions, in dilute solutions of sodium hydrochloride until the silver bearing emulsion is removed from the substrates so that the silver is contained in the solution. The solution may then be placed in a settling tank with the sodium hydroxide to precipitate the silver. However, flocculating agents must also be added to flocculate the particles of silver such that the silver in the settling tank forms into a sludge in the lower strata thereof. The use of bleach as a stripping agent creates a processing burden in the form of uncontrollable foam and the foam interferes with the recovery of silver. The build up of animal protein in solution stripping of photographic emulsions is attacked by the bleach and creates even more foam thus the prior art has utilized defoaming agents, however, such agents interfere with the rapid processing required for economical removal of silver.

Additional prior art methods for recovering silver from photographic materials have included treating the scrap materials with hot caustic material solutions and with solvents. Generally the cut photographic film is sized to small pieces of film and with the caustic aqueous solution forms a slurry. The slurry is then fed to a classification and/or separating system.

It is also known that silver halide emulsions can be readily stripped from various substrates by simply subjecting the film to hot water. The principal draw back to this and other prior art silver recovery techniques is that they are not efficient or frequently use toxic materials. Also, modern emulsions include other polymeric layers which complicate the recovery of the silver. Moreover, merely subjecting small pieces of scrap film or photographic paper to hot caustic or hot water or a solvent, and stirring the mixture in the manner described by the prior art can cause the pieces to stick together when they contact one another so that the high degree of agglomeration occurs. This provides an extremely difficult problem in removing all the silver emulsion. Another problem in prior art processes for recovery of silver from photographic scrap has been that different processes are required for different types of scrap. For instance, the silver content of exposed scrap film is largely in the form of metallic silver, while the silver content of unexposed scrap film is in the form of silver combined as silver halides such as silver bromides. All of these different forms of scrap require different processing steps.

It is an object of the present invention to provide a process which is capable of recovering silver from any of the above forms of photographic scrap, and furthermore is capable of recovering silver from batches of photographic scrap which contain any or all of the above forms of photographic scrap in combination.

It is another object of the present invention to provide an improved process for the recovery of silver from photographic emulsion scrap in which the steps of separating the silver content of the photographic emulsion is achieved in a non-toxic environment.

It is yet another object of the present invention to provide a stripping formulation for removing photographic silver emulsions from paper or film substrates which avoids precipitation of the silver material during stripping and substrate separation.

SUMMARY OF THE INVENTION process for recovery of silver from silver containing photographic emulsions coated on paper or film substrates is achieved through immersion of the silver emulsion coated substrates into an alkaline bleach solution which has sufficient presence of an alkali metal hydroxide to substantially avoid production of free chlorine or silver chloride. Stripping of the silver containing emulsions from the substrates is achieved while dissolving animal protein contained in the emulsions through controlled conditions thus avoiding significant foaming problems which interfere with the efficiency of stripping and separating the silver and emulsion materials from the stripped substrates. Once the emulsion is stripped from the substrate, the silver, silver halides and animal proteins under controlled pH conditions are dispersed or dissolved into solution and are readily separated from the substrate materials. The solution is then treated with a strong or highly ionized acid such as hydrochloric acid, nitric acid, sulfuric acid and the like. The treatment of the solution containing silver, silver halides and animal proteins with for example hydrochloric acid results in the precipitation of hydrolizyed animal protein simultaneously the silver and silver halide are precipitated with the animal protein. The precipitate is dried to a sludge and then the carbon materials of the sludge are burned under a controlled temperature of from about 500° F. to about 600° F. The waste fluids from the solution are neutralized with sodium hydroxide and are suitable for sewer release.

A stripping formulation for removing photographic silver emulsions from paper or film substrates is also provided according to the invention wherein the solution comprised of an alkaline hypochloride solution with a sufficient presence of an alkali metal hydroxide substantially avoids production of free chlorine or silver chloride. The stripping formulation is capable of maintaining the animal protein, silver and silver halide of the emulsion in solution during stripping and separation of the film substrates from the solution. Such a unique formulation provides a process for recovery of silver allowing for controlled precipitation after the substrates have been removed from the solution.

DETAILED DESCRIPTION OF THE INVENTION

The present invention provides an efficient, economically attractive process which is non-toxic for recovering silver from scrap photographic materials by chemical and mechanical separation of the silver halide emulsions from the emulsion coated substrates. The photographic scrap is preferably cut or chopped into small pieces or flakes of various sizes and shapes ranging in size from about 0.2 to about 1.5 square inches. The sized photographic scrap material is then immersed and mixed with an alkaline hypochlorite solution which has sufficient presence of an alkaline metal hydroxide to substantially avoid production of free chlorine or silver chloride. The immersion and stripping step in the alkaline hypochlorite solution is under controlled temperatures, i.e., below about 80° F. at which temperature the bleach breaks down rapidly. The pH of the alkaline hypochlorite solution is generally maintained between about 10 to 11 which allows for appropriate stripping of the emulsions and the silver to remain in solution through the avoidance of forming silver chloride.

The process according to the invention utilizes controlled amounts of for example sodium hydroxide with for example a sodium hypochlorite bleach, i.e., a 10% bleach to strip photographic emulsions. For example, about 10 grams of sodium hydroxide is combined with about 227 grams of 10% bleach to strip approximately one pound of photographic scrap. The remaining variable is the amount of water and the function of water in making up the stripping solutions, rinsing and reduction of foam generation. In the correct relationship with the photographic scrap, water is provided in sufficient volume so that the separation of the silver, silver halide and animals proteins from the substrate can be efficiently achieved. The appropriate water volume also is instrumental in controlling heat or reaction so that the bleach is not lost through thermal breakdown. Even heat generated by the stirring action of the pumps and stirring of fan blades and the like is absorbed by water. Water is present in about one gallon of water per pound of photographic scrap to about one half gallon of 10% bleach to 10 grams of sodium hydroxide which provides a unique stripping solution for the scrap photographic materials.

For exemplary purposes, a suitable combination for a pilot plant was developed with the best volume of water to pounds of photographic scrap being 150 pounds of scrap, 150 gallons of water, 75 gallons of 10% bleach, 3 pounds of sodium hydroxide. The stripping process can also be utilized in multiple batch treatments of the same scrap since the emulsion protein may not totally strip from the film or scrap in one batch stripping. Fresh water is utilized with each stripping stage. The need for fresh water is due to the potential of extreme foaming.

The role of the alkali metal hydroxide varies slightly depending on whether the photographic substrate is paper or polymeric film. In a preferred embodiment the alkali metal hydroxide for example, sodium hydroxide should be added before the bleach with paper substrate because the sodium hydroxide breaks down the surface tension of the paper pulp and allows water to seal the edges of the paper preventing silver and silver halides from lodging between the leaves of plastic on each side of the paper. Commercial bleach, sodium hypochlorite is comprised of about 7% free chlorine and the need to neutralize this 7% with sodium hydroxide is in order to keep from forming silver chloride and possibly chlorine gas comprises the unique use according to the inventive process of sodium hydroxide. In addition, sodium hydroxide added to free chlorine will generate additional sodium hypochlorite plus sodium chloride in equal portions which aids in controlling some of the foam that is generated without the controlled pH solution.

Most acid development techniques leave an acid powder on developed photographic scrap, for example, sodium thiosulfate the like. Sodium hydroxide neutralizes these acids giving better control of the stripping solution in that the bleach is not broken down prematurely. Sodium hydroxide also softens the water for washing action and prevents silver from becoming silver chloride and sticking on the face of the plastic or paper substrate materials. Various other alkali metal hydroxides such as potassium hydroxide can be utilized in place of sodium hydroxide, however, sodium hydroxide is more economical.

Once the photographic scrap substrates have been stripped of the animal protein, silver and silver halide various separation processes can be utilized, however, for the purposes of this invention, the combination of silver laden solution, animal protein and plastic chips are introduced to a fine screen wherein the film chips are caught while the silver and protein solutions pass through. The container with the screen is supported in such a way that the accumulated chips can be readily dumped. However, to make sure all the silver is collected, the chips are dumped into the same tank after the silver and animal protein solution has been pumped to another tank for precipitation. The film chips are then rinsed and then pumped into a similar tank with a basket and the rinse water becomes the next strip water while the film chips are disposed of in a trash dumpster or recovery mode whichever procedure is appropriate. Since centrifugal, vacuum devices and the like are expensive and require extensive maintenance the task of removing the silver particulate, silver halide from solution required a different approach. In a preferred embodiment, hydrochloric acid is added to the solution which both coagulates the animal protein and simultaneously drops the silver and silver halide with the animal protein coagulated precipitate to the bottom of the tank in a timely fashion. Separation of the unwanted solution through filtration and collection of the silver plus the animal protein from the bottom of the tank is achieved followed by drying and controlled burn of the carbonaceous materials, i.e. the animal protein which leaves a concentrate of silver and silver halide material. These materials can be placed in a furnace and smelted with a standard flux in order to achieve silver ingots.

The waste solution from the precipitation process has an acid pH of from about 2 to about 4 or greater which must be neutralized before being acceptable for environmental guideline sewer disposal. Sodium hydroxide is utilized to neutralize the acid to a pH of 7 and thus the waste solution becomes a non-toxic solution of mild salty water and animal protein which is left after precipitation or coagulation of protein and can be introduced into the local sewer system.

Figure 2:
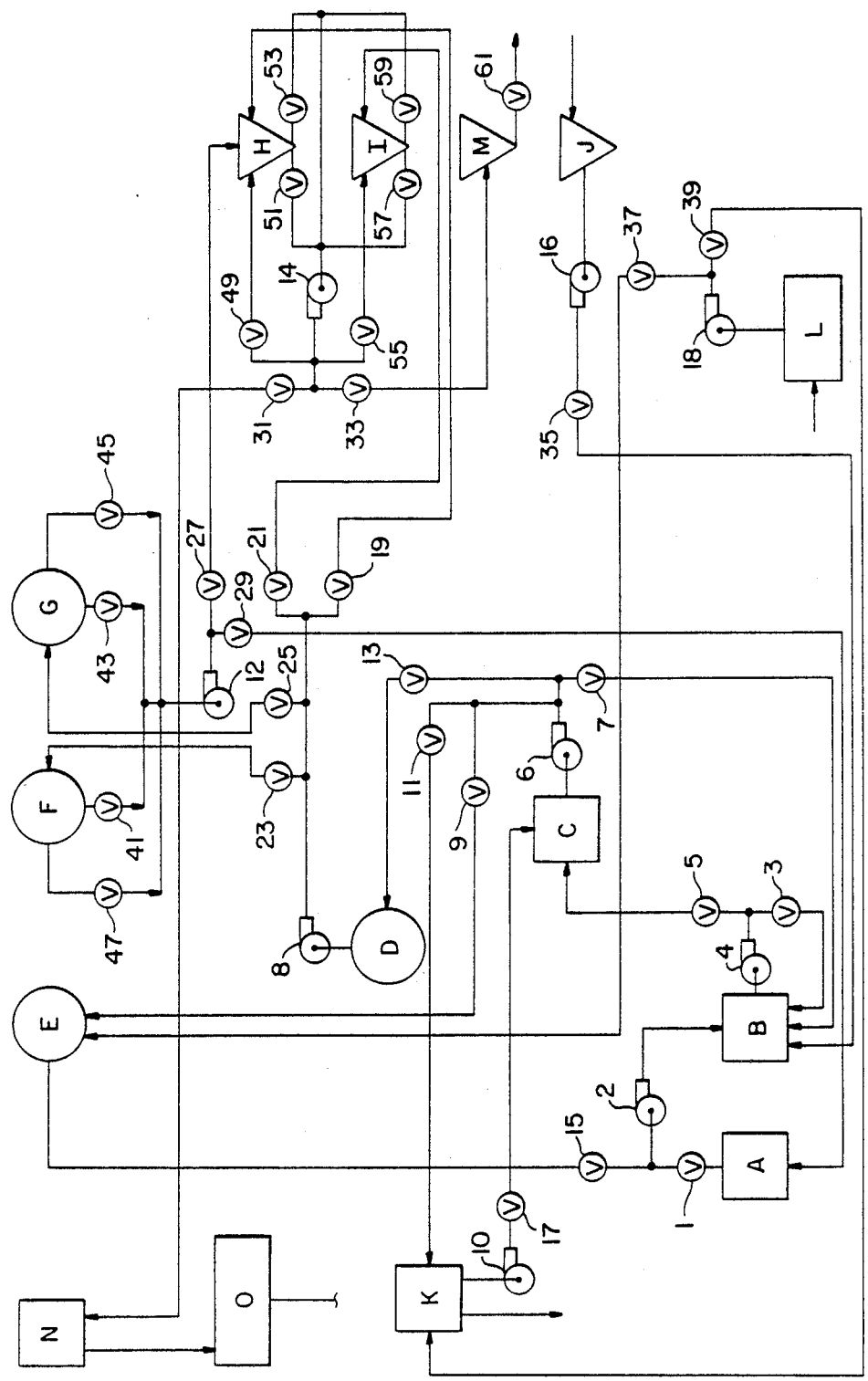
FIG. 2 is a detailed equipment flow sheet of the non-toxic photographic silver recovery process inclusive of stream flow and apparatus with alternative steps.

In general, each piece of equipment as discussed in FIG. 2 was designed or built to do a specific job. Most of the apparatus utilizes appropriate materials because of the high caustic or high acidic levels of the solutions used. For example, much of the equipment is constructed of wood with fiberglass liners and/or PVC sheet material linings. One tank was designed as a round tank with a stirring blade off the bottom, the tank having a false bottom screen so that one pump can serve all three operations of stripping, rinsing and discharge from the top of the pouring liquid into a flowing trough to get rid of the spent film in a self-dumping collection screen basket. The tank is filled with proper amounts of water with the film being introduced into the water, the sodium hydroxide is then introduced and finally the proper amount of bleach is introduced into the solution which is being stirred for stripping purposes. After stripping the solution is removed through the bottom of the tank by pump while the film or paper is retained in the tank by the false bottom screen. The same pump is then used to bring in rinse water which is stirred by the stirring blade. After rinsing, the rinse water is pumped out by the same pump which then pumps in fresh water all the way to the pouring lip over the top and the stirring blade is reversed and brings the film into floatation. While the pump is adding more water the spent film flows out of the tank into a trough that has water moving through the trough to a point of collection. The stripped solution goes immediately to a precipitation tank and the rinse water is held in a separate tank for the next strip and new water is added to rinse water tank to replace water used in the rinse. The water is generally used about three times before going to the precipitation tank. This type of system has cost advantages in both the amount of water used and the amount of equipment necessary to achieve the non-toxic recovery of photographic silver.

The facility layout of FIG. 2 provides an example of an economic, non-toxic process for the recovery of silver from photographic scrap inclusive of plastic film or paper substrates. Tank identification of FIG. 2 is as follows:

| TANK | NAME |
| --- | --- |
| A | Secondary Solution Tank |
| B | Stripper Tank |
| C | Separation Tank |
| D | Screen Tank |
| E | Rinse Water Tank |
| F | Silver Concentrate Holding Tank |
| G | Silver Concentrate Holding Tank |
| H | Precipitation Tank |
| I | Precipitation Tank |
| J | Bleach Tank |
| K | Trash Tank |
| L | Fresh Water Tank |
| M | Final Processing Tank |
| N | Filter Box |
| O | Neutralization Tanks |

Again for exemplary purposes, the above identified tank capacities and structures can be as follows:

| | |
| --- | --- |
| A | 600 Gal. wood tank with PVC liner. Taper sides, channel bottom. |
| B | Same as A. Fan used for recirculation of mixture. |
| C | Same A. Wire screen used to capture paper/film. |
| D | 400 Gal. Fiberglass, flat bottom with nylon mesh insert. |
| E | 1600 Gal. Plastic, round, flat bottom. |
| F | Same as E. |
| G | Same as E. |
| H | 1600 Gal. Plastic round, taper bottom. |
| I | Same as H. |
| J | 800 Gal. Plastic, round, taper bottom. |
| K | 1600 Gal. Plastic, flat 6' × 8' × 6'. |
| L | 2700 Gal. Steel, flat bottom. |
| M | 800 Gal. Plastic, round, taper bottom. |
| N | Plastic tank. Filters - 3, one micron, 27 cubic feet. |
| O | 2500 Gal. Fiberglass. |

Pump and Valve Specification

| Pumps: | |
| --- | --- |
| 2, 4, 6 | 3", 7.5 HP, 356 GPM Trash pump |
| 10 | 3", 5 HP, 298 GPM Trash pump |
| 12, 8, 18 | 1.5" inlet, 1.25" outlet, 1.5 HP, 90 GPM |
| 14 | 1.5" inlet, 1.0" outlet, .75 HP, 46.5 GPM |

| Pumps: | |
|---|---|
| 16 | .5" inlet, .5" outlet, 1/25 HP, 5.9 GPM |

Vales:
3" plastic ball valves:
2, 3, 5, 7, 9, 11, 13, 15, 17
1.25" plastic ball valves:
19, 21, 23, 25, 27, 29, 31, 33, 35, 37, 39
1.50" plastic ball valves:
41, 43, 45, 47, 49, 51, 53, 55, 57, 59, 61

Figure 1:
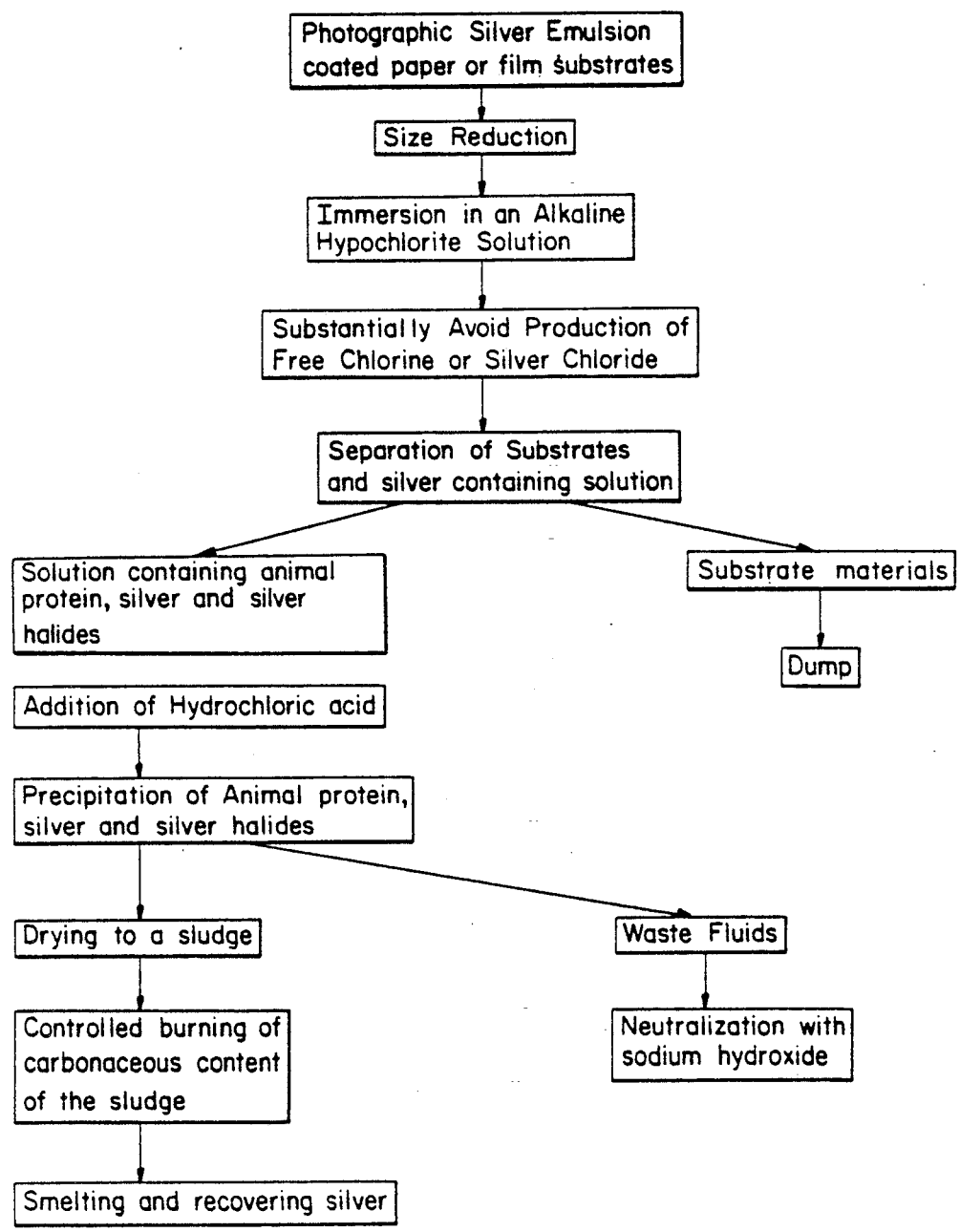
FIG. 1 presents a flow diagram which is in accordance with the process of the invention, however, the diagram should not be considered as limiting to the scope of the invention.

An exemplary process description is presented in accordance with the apparatus of FIG. 2 inclusive of the mechanical and chemical processing. Photographic scrap comprised of silver emulsion coated film or paper is sized to particle size of about 0.25 to about 1.5 square inches. When possible, the process description varies depending if film substrate or paper substrate constitutes the majority of the photographic scrap; however, both paper and film can be processed according to the invention as shown in the flow diagram of FIG. 1. For purposes of this immediate description, the ground photographic scrap will be defined in different alternatives based on film or paper substrates. Sodium hydroxide is used to capture the 7% free chlorine in the 10% bleach (sodium hypochlorite), to prevent the production of chlorine gas. The sodium hydroxide also prevents the formation of silver chloride as well as forms about 3.5% sodium hypochlorite. The 10% hypochlorite is used to dissolve the animal protein which liberates the silver halide and any metallic silver in the emulsion. The animal protein remains in suspension in the solution. The alkaline hypochlorite solution is placed in Tank B and for film substrate a pump is used to recirculate the solution for proper stripping action. The mixture from Tank B is pumped to Tank C, a basket traps the stripped film. The solution from Tank C is pumped to Tank D for fine filtering of the solution. A flip basket is used in Tank C to place stripped film into the tank. Water is pumped from Tank K to Tank C and then this water and film from Tank C is pumped back to Tank K. Tank K contains another basket to capture film for disposal at the city dump or recovery. The water is reused. The solution from Tank D is pumped to either Tank H or I. At this point in the process the origin of the animal protein, silver and silver halide containing solution is immaterial whether from film substrate scrap or paper substrate scrap.

Turning now to address the process wherein the photographic materials are primarily coated on paper substrates, after sizing, the photographic materials are introduced to the same alkaline hypochlorite solution as defined above for the photographic materials substantially comprised of film substrates. For paper substrates, a fan type mixing device instead of a pump is used for recirculation agitation for stripping purposes. The paper is floated to the surface of the solution as a separation stage and removed from the surface. The solution including the photographic emulsion materials such as animal protein, silver and silver halides is pumped to Tank C. Tank B is filled with 75 gallons of water from Tank E which constitutes the rinse cycle for the paper only. The solution from Tank C is pumped to Tank D. The rinse solution and paper from Tank B is pumped to Tank C with the basket of C entrapping the stripped paper. The rinse solution from Tank C is pumped to Tank E for reuse purposes. The paper waste after the various rinse cycles is in a suitable condition for disposal in the city dump or other appropriate nontoxic disposal systems. The solution from Tank D is pumped either to Tank F or Tank G. This procedure is to occur for five runs for each tank. At the sixth run the solution is pumped to Tank H or I. The solution in Tank F and G is reused in step 2 when utilizing a recycle process. Again at this point both cycles can be joined for further processing.

When Tanks H or I contain 1500 gallons, hydrochloric acid is added and recirculated and allowed to hydrolyze the animal protein which precipitates the significant amount of animal protein and the entrapped silver and silver halide constituents. The hydrochloric acid converts sodium hydroxide to salt and also hydrolyzes the animal protein triggering quick precipitation of the materials to the bottom of the tank including the silver and silver halides. The solution from Tanks H or I is pumped to filter box N. Pumping action is maintained until the tanks are dry through Valve 51 or 57 through Pump 14. The remaining solution is pumped through Valves 53 or 59 through Pump 14 to final processing Tank M. With at least about 400 gallons of silver containing solution in Tank M, the solution is dewatered the solution to a thick sludge. The sludge is placed into a controlled carbon burn environment at temperatures of from about 500° F. to 600° F. for burning off the animal protein carbons. The remaining material is finely ground to a powder and smelted with appropriate fluxes in order to achieve silver in ingot form. The waste water in Tank O is neutralized with sodium hydroxide for dispersal purposes, i.e. a mild salty water which can be released into a city sewer system.

The exemplary processes descriptions in accordance with the apparatus of FIG. 2 are further defined by the following chemical ratios and process times.

| Alkaline Hypochlorite Solution | |
|---|---|
| For film: | |
| Film | 150 Lbs. |
| $H_2O$ | 150 Gal. |
| NaOH | 3 Lbs. |
| NaOCl | 7.78 Gal. |
| Recirculate speed | 356 GPM |
| Processing time | 6-8 min. |
| For paper: | |
| Paper | 150 Lbs. |
| $H_2O$ | 300 Gal. |
| NaOH | 3 Lbs. |
| NaOCl | 7.78 Gal. |
| Fan recirculating speed | 35 RPM |
| Processing time | 2-3 min. |

Water is resued one additional cycle for paper processing.
Ratios:
0.5 Lbs of 10.5% NaOCl per 1 Lb paper/film
1 Lb paper/film per 1 Gal $H_2O$
9.6363 Lbs NaOCl per Gal. (weight to volume)

| Acid Treatment | |
|---|---|
| Solution containing animal protein, silver and silver halide | 1500 Gal. |
| Hydrochloric acid preferably in a concentration of at least 5% | 13.5 Gal. |
| Recirculate speed | 46.5 GPM |
| Recirculate time | 5-10 min. |
| Precipitation time | 3-6 hrs. |
| Waste Water Neutralization | |

-continued

| | |
|---|---|
| NaOH | 1-1.5 Lb/100 Gal. waste solution |

NaOH is added to achieve Ph of 7.

It will be obvious to those skilled in the art that various modifications of the invention may be resorted to without departing from the spirit and scope thereof.

We claim:

1. A process for recovery of silver from silver containing photographic emulsion coated paper or film substrates, comprising:

immersing photographic emulsion-containing silver, silver chloride and animal protein coated substrates in a sodium hypochlorite solution which has sufficient presence of an alkali metal hydoxide to maintain the solution at a pH of about 10-11 which substantially avoids production of free chlorine and silver chloride;

stripping the silver containing emulsion from the substrates while dissolving animal proteins, silver and silver halides contained in the emulsion, thereby forming a solution of animal proteins, silver and silver halides contained in the silver emulsion and a stripped substrate;

separating the stripped substrate from the solution of animal proteins, silver and silver halides;

introducing a highly ionized acid selected from the group consisting of hydrochloric acid, nitric acid and sulfiric acid to the solution of animal protein, silver and silver halides, thereby forming a precipitate of hydrolyzed animal protein, silver and silver halides and waste fluid;

separating the precipitate from the waste fluid;

neutralizing the waste fluid with sodium hydroxide;

drying the precipitate to a sludge containing hydrolyzed animal protein; silver and silver chloride;

burning the animal protein of the sludge in an oven at a temperature of from about 500° F. to about 600° F., producing a concentrate of silver and silver halide; and smelting the concentrate with flux to form a silver ingot.

2. The process according to claim 1 wherein the alkaline hypochlorite containing bleach solution is comprised of sodium hypochlorite.

3. The process according to claim 1 wherein the acid is comprised of hydrochloric acid having concentration of at least 5%.

4. The process according to claim 1 wherein the base is comprised of an alkali metal hydroxide.

5. The process according ot claim 1 wherein the stripping solution is maintained at a temperature of less than about 80° F.

6. The process according to claim 1 wherein resulting residue of sludge burn-off is smelted with appropriate flues in order to achieve silver ingot.

7. The process according to claim 1 wherein size reduction of the photographic emulsion coated paper or film results in pieces having an average diameter of from about 0.25 to about 1.50 square inches.

8. A process for recovery of silver from silver containing photographic emulsion coated paper or film substrates, comprising:

immersing photographic emulsion-containing silver, silver chloride and animal protein-coated substrates in a sodium hypochlorite solution which has sufficient presence of an alkali metal hydoxide to maintain the solution at a pH of about 10-11 which substantially avoids production of free chlorine and silver chloride;

stripping the silver containing emulsion from the substrates while dissolving animal proteins, silver and silver halides contained in the emulsion, thereby forming a solution of animal proteins, silver and silver halides contained in the silver emulsion and a stripped substrate;

separating the stripped substrate from the solution of animal proteins, silver and silver halides;

introducing hydrochloric acid to the soution of animal proteins, silver and silver halides, thereby forming a precipitate of hydrolyzed animal protein, silver and silver halides and waste fluid;

separating the precipitate from the waste fluid;

neutralizing the waste fluid with sodium hydroxide;

drying the precipitate to a sludge containing hydrolyzed animal protein; silver and silver chloride;

burning the animal protein of the sludge in an oven at a temperature of from about 500° F. to about 600° F., producing a concentrate of silver and silver chloride; and smelting the concentrate with flux to form a silver ingot.

9. The process according to claim 8 wherein the alkaline hypochlorite stripping solution temperature is maintained at a temperature of less than about 80° F.

10. A non-toxic process for recovery of silver from silver containing photogrpahic emulsion coated paper or film substrates, comprising:

immersing photographic emulsion-containing silver, silver chloride and animal protein-coated substrates in an alkaline hydrochloride bleach solution which has sufficient presence of an alkaline metal hydroxide to maintain the solution at a pH of at least about 10 which substantially avoids production of free chloride or silver chloride wherein the bleach solution is comprised of from about 0.5 to about 1.5 pounds of sodium hydroxide per 50 gallons of water and from about 2.5 to about 3 gallons of sodium hypochlorite which is suitable for immersing 50 pounds of silver emulsion coated substrate;

stripping the silver containing emulsion from the substrate while dissolving animal protein, silver and silver halide contained in the sivler emulsion, thereby forming a solution of animal proteins, silver and sivler halides; separating the stripping substrate materials from the solution of animal proteins, silver and silver halides and waste fluid;

introducing a highly ionized acid selected from the group consisting of hydrochloric acid, nitric acid, and sulfuric acid to the solution;

forming a precipitate of hydrolyzed animal protein, silver and sivler halides and waste fluid;

separating the precipitate from the waste fluid;

neutralizing the waste fluid with sodium hydroxide;

drying the precipitate to a sludge containing hydrolyzed animal protein; silver and silver chloride;

burning the animal protein of the sludge in an oven at a temperature of from about 500° F. to about 600° F., producing a concentrate of silver and silver chloride; and smelting the concentrate with flux to form a silver ingot.

11. A process for recovery of silver from silver-containing photographic emulsion-coated paper or film substrates, comprising:

immersing photographic emulsion-containing silver, silver halides, and animal protein-coated substrates in a sodium hypochlorite solution which has sufficient presence of an alkali metal hydroxide to maintain the solution at a pH of about 10 to 11;

stripping the silver-containing emulsion from the substrates while dissolving animal proteins, silver and silver halides contained in the emulsion, thereby forming a solution of animal proteins, silver and silver halides contained in the silver emulsion and a stripped substrate;

separating the stripping substrate from the solution of animal proteins, silver and silver halides;

introducing a strong acid to the solution of animal proteins, silver and silver halides, thereby forming a precipitate of hydrolyzed animal proteins, silver and silver halides and waste fluids;

separating the precipitate from the waste fluid;

neutralizing the waste fluid with sodium hydroxide;

drying the precipitate to a sludge containing hydrolyzed animal protein; silver and silver halides;

burning the animal protein of the sludge in an oven at a temperature of from about 500° F. to about 600° F., producing a concentrate of silver and silver chloride; and smelting the concentrate with flux.

* * * * *